Dec. 18, 1951         S. DANIELS              2,578,675
               MANURE-SPREADER CLUTCH
Filed March 2, 1949                    3 Sheets-Sheet 1
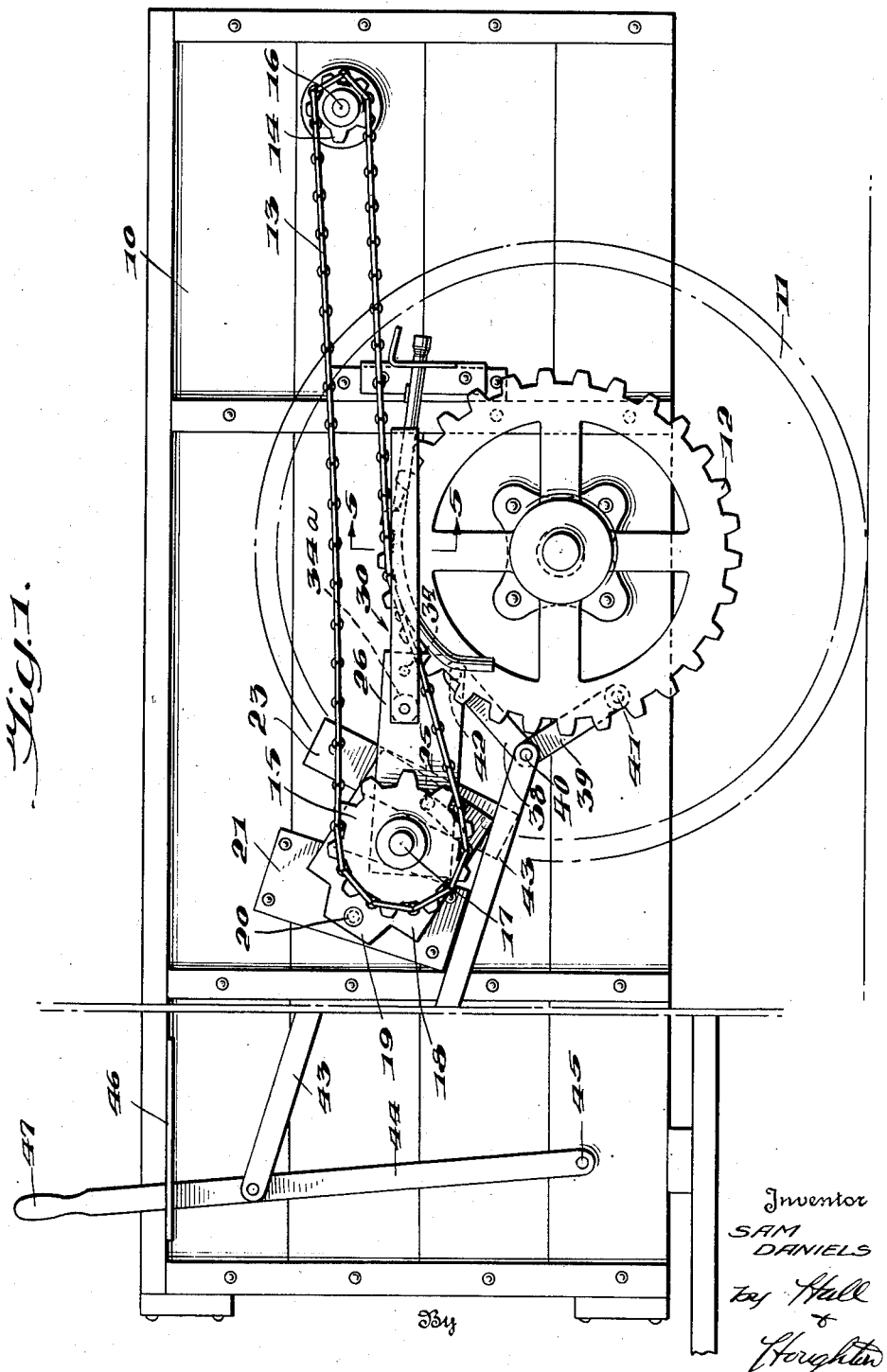

Dec. 18, 1951     S. DANIELS     2,578,675
MANURE-SPREADER CLUTCH
Filed March 2, 1949     3 Sheets-Sheet 2
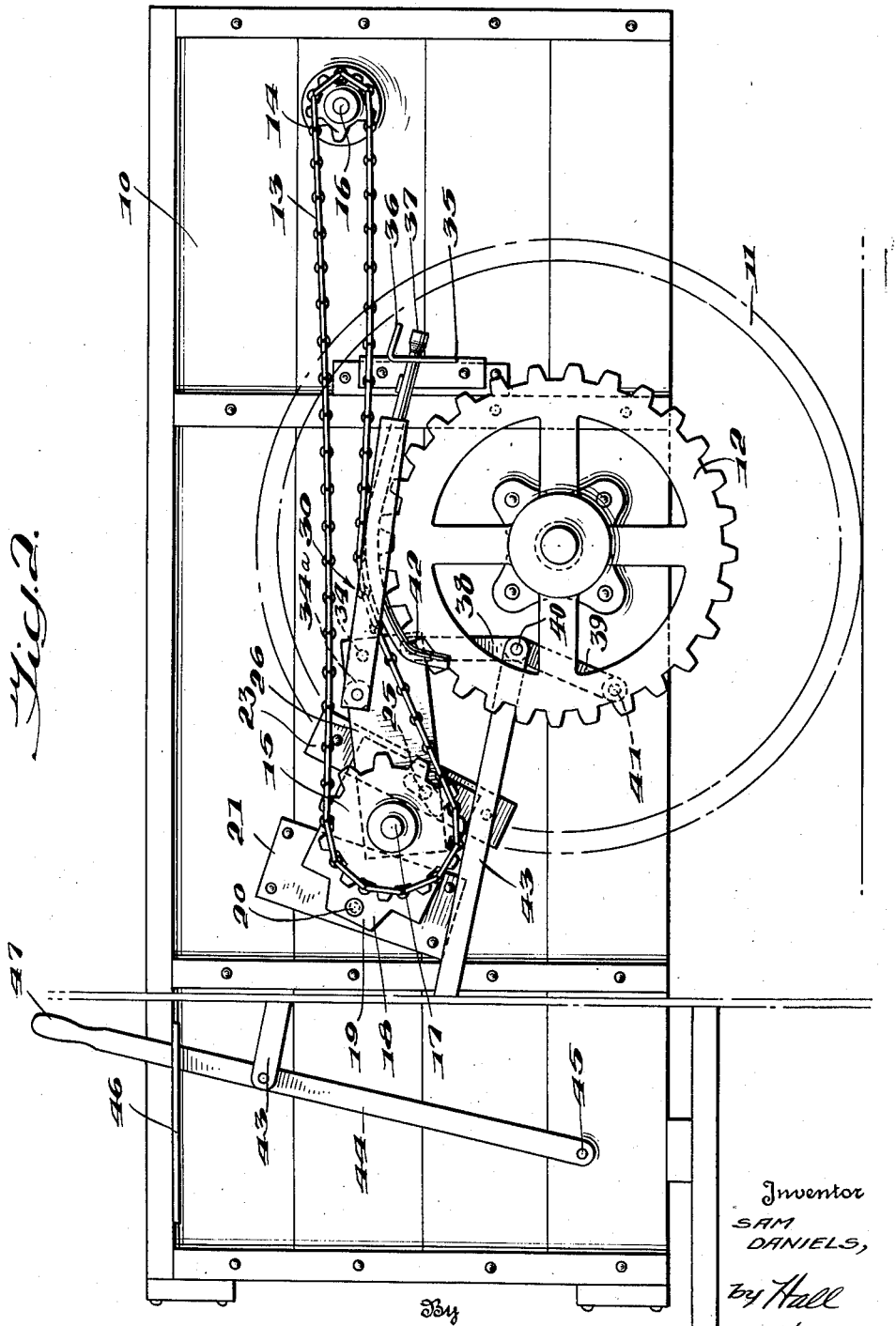

Dec. 18, 1951  S. DANIELS  2,578,675
MANURE-SPREADER CLUTCH
Filed March 2, 1949  3 Sheets-Sheet 3
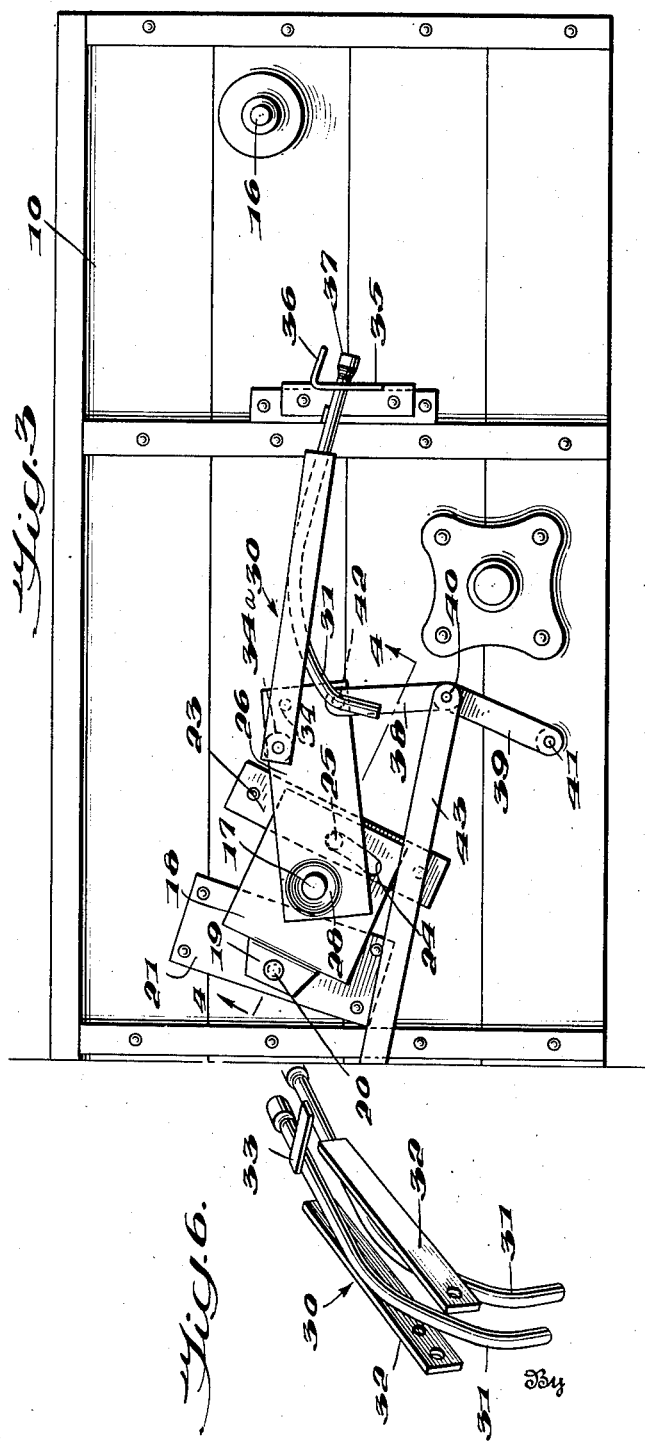
Inventor
SAM DANIELS,
By
Hall + Houghton
ATTORNEYS Patented Dec. 18, 1951

2,578,675

UNITED STATES PATENT OFFICE 2,578,675

MANURE-SPREADER CLUTCH

Sam Daniels, Hardwick, Vt.; Elwyn J. Daniels administrator of said Sam Daniels, deceased Application March 2, 1949, Serial No. 79,196

18 Claims. (Cl. 74—221)

This invention relates to manure-spreaders and the like and aims to provide an improved chain clutch or throw-out arrangement therefor.

In devices of this class the material handling elements are usually chain-driven from a chain-driving sprocket, which in turn is usually driven by the wheels of the vehicle as it is pulled across the field. To interrupt this drive it is customary to disengage the chain from the chain-driving sprocket in some fashion. The chain throw-out arrangements heretofore employed for this purpose have required spring-tensioned idler sprockets, lifter roll means, and complicated sprocket supporting arms for swinging one of the chain-mounting sprockets to wrap the chain around the driving sprocket or unwrap it and lift it therefrom, and have been difficult to set up and align and to maintain in alignment and repair.

A general object of the present invention is to provide a simple and effective chain clutch or throw-out for such devices which avoids the complications and disadvantages heretofore experienced. Other objects and advantages of the invention will be apparent from the following description of a preferred embodiment thereof. The invention resides in the features and combinations of parts hereinafter described and pointed out in the appended claims.

In the accompanying drawings of an illustrative embodiment of the invention:

Fig. 1 is a more or less diagrammatic side elevation of a manure-spreader partly in phantom showing the clutch parts in chain-driving position.

Fig. 2 is a similar view showing the clutch parts in throw-out position.

Fig. 3 is a similar view of the throw-out mechanism in throw-out position, with the chain and sprockets removed.

Fig. 4 is a sectional detail taken on the line 4—4 of Fig. 3 looking in the direction of the arrows.

Fig. 5 is a sectional detail taken on the line 5—5 of Fig. 1 looking in the direction of the arrows.

Fig. 6 is a perspective view of the chain lifting element.

The manure spreader indicated in Figs. 1 and 2 comprises a body 10, provided with wheels indicated at 11, which drive a chain-driving sprocket 12 in any conventional manner.

The chain 13, driven by the sprocket 12, is trained about two sprockets 14 and 15. The first of these sprockets, in the form shown, is rotatable on a fixed axis (the axis of the stub axle 16 is secured to the body 10 in the form shown), and the second is rotatable on a swingable axis (the axis of the stub shaft 17) which is carried by the swing plate 18. This swing plate, as best shown in Fig. 3, is provided with a pivot ear 19 which swings on a pivot stud 20 carried by wear plate 21, shown as bolted to the side of the body 10. The opposite end of the swing plate 18 rides on a second wear plate 23, likewise bolted to the body, and is provided with an arcuate slot 24 which engages over a lug or stud 25 carried by this wear plate, to limit the swing of the swing plate.

In the assembly shown, one link of the double-toggle chain lifter hereinafter described; namely, the link 26, shown as plate-like in form, is pivoted to the swing plate 18; this pivoting being accomplished in the form shown, by providing the swing plate 18 with a hub or bearing shoulder 27 and providing the lifter plate 26 with a socket 28 concentric with the hub 17 which rotates on the bearing hub 27, an interposed spacer or anti-friction washer being employed between these parts, if desired. Any suitable means, indicated in Fig. 4 as a cotter pin and washer assembly 29, may be employed to maintain these parts assembled.

The first toggle of the double-toggle chain lifter is in effect a floating means or toggle chain lifter, and comprises the aforesaid link 26 and a second link or lifter element 30 (see Figs. 3 and 6). This lifter element in the form shown is made up of two supporting bars or rods 31, shown as tubular, which are spaced to straddle the chain-driving gear 12 (see Fig. 5), and on which the lower run of chain 13 may rest. The rods 31 have downwardly and slightly outwardly turned-forward ends which cooperate with the rim of the sprocket 12 to insure at all times proper alignment of the chain 13 therewith. The rim of sprocket 12 is formed, either in width or depth, of sufficient size to avoid contact of the rods 31 with the spokes thereof. The two rods 31 have suitably secured thereto, as by welding for example, side plates 32 and cross brace 33. One of the plates 32, at the knee portion 34 of the toggle, is pivoted to the companion toggle plate 26, as by a bolt or other pivot member. The plates 32 at this end extend beyond the knee and above the normal path of the chain run (see Figs. 1 and 2) and carry a chain retainer or depresser 34a which overlies the chain. In the preferred form, as best shown in Fig. 4, this depresser comprises a roller or pipe section rotatably mounted on a welded-in pintle which serves as an additional spacer for the side plates 32.

The lifter link 30 at its other end is supported crankwise, for reciprocating and tilting motion, in the form shown by passing the ends of the rods 31 through a guide plate 35 (see Fig. 3) shown as an angle bracket bolted or otherwise secured to the body 10. The upper end 36 of the guide plate 35 underlies the lower run of chain 13 and is rolled over as shown to prevent catching of the chain on the tips of members 31 in the event of breakage thereof. The tips of the rods 31 may be capped or otherwise enlarged, as indicated at 37 to prevent withdrawal thereof from the guide plate 35.

The second toggle of the double-toggle chain lifter is made up of two links 38 and 39, best shown in Fig. 3. These links are pivoted together at their knee 40, the other end of link 39 being pivoted to the body 10 at 41, and the other end of link 38 being pivoted to the first toggle at 42, in the knee region thereof.

To the knee region of the second toggle 38—39, herein to the knee joint 40, is pivoted the draw-bar 43, best shown in Figs. 1 and 2. This drawbar extends to a throw-out lever 44 (Figs. 1 and 2) which is pivoted to the body at 45, swings in a slotted guide plate 46 and is provided with a handle 47. When handle 47 is moved to its forward position (Fig. 1) the second toggle is drawn forwardly of its dead-center position and drops the first or chain lifting toggle, lowering the chain run into engagement with the chain-driving gear 12. In this position the driving gear 12 pulls the chain in the direction from the fixed sprocket 14 toward the swing-sprocket 15. The swing plate 18, carrying sprocket 15, drops to its lowermost position, as limited by stop means 24, 25 (Fig. 3) or to a position close thereto if the chain is a little tighter, taking up the slack in the chain. This moves the knee 34 of the first toggle downwardly and somewhat forwardly, as shown by a comparison of Figs. 1 and 2, and positions chain depresser 34a close above the chain 13 insuring proper engagement and drive of the chain, and protection in the event of breakage thereof. The weight of the swing plate, the swing sprocket, the chain, and the associated toggle parts urges the chain into driving engagement, effecting a very positive engagement of the drive, without requiring undue exertion by the operator.

When the handle 47 of lever 44 is moved to its rearmost position (Fig. 2), the draw-bar 43 forces the second toggle through its dead-center position and stops its motion slightly rearwardly thereof. This action elevates the pivot point 42 raising the knee of the first-, or lifter-toggle 26, 30, and lifting the chain 13 from engagement with the sprocket 12 into the non-driving position shown. The deflection of the chain run by the lifter link 30 is compensated for by the swinging of the swing plate 18 about pivot 20, which moves the swing-sprocket 15 somewhat closer to the fixed sprocket 14, as shown.

From the foregoing description it will be perceived that the present invention provides a simple, pre-aligned construction, which is sturdy, presents few wearing parts, avoids need for provision and adjusting of springs and idler sprockets and other parts, and minimizes chances of misalignment or of breakage of the chain if the chain is shifted into driving position while the vehicle is in motion. It will also be apparent that the specific embodiment herein disclosed is illustrative and not restrictive of the invention, the scope of the invention being defined in the appended claims. All modifications which come within the meaning or range of equivalency of the claims are therefore intended to be included therein.

I claim as my invention:

1. In a manure-spreader or the like, and in combination, a chain trained about two sprockets, the first of said sprockets being rotatable on a fixed axis and the second being rotatable on an axis swingable towards and from the first, a chain-driving sprocket positioned for engaging a run of said chain between said first-mentioned sprockets, a chain lifter associated with said chain run and comprising a toggle having one of its ends pivoted on said swinging axis and the other of its ends crankwise mounted and having its knee raising and lowering therebetween, and an operating toggle means for lifting and lowering the knee of said first-named toggle, said operating toggle means holding said knee raised when on one side of its dead-center position, to hold said chain out of engagement with said chain-driving sprocket, and lowering said knee when on the other side of its dead-center position to lower said chain into engagement with said chain-driving sprocket.

2. A combination according to claim 1 in which the crankwise-mounted end of said first-named toggle is pivotally reciprocable through a fixedly positioned guide plate.

3. A combination according to claim 2 in which said guide plate underlies said chain run and comprises means for supporting said chain run in the event of breakage of the chain.

4. A combination according to claim 1 in which said chain lifter comprises a chain depressing means overlying said chain run.

5. A combination according to claim 4 in which said chain-depressing means is located in the knee region of said first-named toggle.

6. A combination according to claim 5 in which said chain-depressing means comprises a roller rotatable on a portion of a lifter link of said first-named toggle extending beyond its knee joint and overlying said chain.

7. A combination according to claim 1 in which said first-named toggle comprises a pair of parallel bent rods adapted to straddle the rim of said chain-driving sprocket and to support said chain run, and a pair of side plates secured relative thereto and forming a guide channel for said chain.

8. A combination according to claim 7 in which at least one of said side plates is pivoted at the knee of said toggle.

9. A combination according to claim 8 in which said plates carry a chain depressor above said chain run.

10. A combination according to claim 9 in which said chain depressor comprises a roller rotatable on a portion of one of the links of said lifter-toggle extending beyond the knee pivot of said first-named toggle and overlying said chain.

11. A combination according to claim 1 in which said first-named toggle comprises a pair of parallel bent rods adapted to straddle the rim of said chain-driving sprocket and to support said chain run, and a pair of side plates secured relative thereto and forming a guide channel for said chain, and in which said bent rods are pivotally reciprocable through a fixedly positioned guide plate.

12. In a device of the class described, and in combination, a chain trained about two sprockets, the first of said sprockets being fixedly positioned and the other being swingable toward and from said first sprocket, a chain-driving sprocket positioned for engaging a run of said chain between said first mentioned sprockets, a chain lifting frame arranged in one position thereof to lift said chain run from engagement with said chain-driving sprocket, and in another position thereof to lower said chain run into engagement with said chain-driving sprocket, and toggle means for lifting and lowering said frame, said toggle means when moved to one side of its dead-center position holding said frame raised to hold said chain out of engagement with said chain-driving sprocket, and when moved to the other side of its dead-center position lowering said frame to lower said chain into engagement with said chain-driving sprocket.

13. In a device of the class described and in combination, a chain trained about two sprockets, the first of said sprockets being rotatable on a fixedly positioned axis and the second being rotatable on an axis carried by a swing plate, said swing plate being pivoted at a point above the center-line of said sprockets and farther from said first sprocket than the axis of said second sprocket, a chain-driving sprocket positioned below said center-line with its teeth engageable by the lower run of said chain, and double-toggle means for lifting said lower run from said chain-driving sprocket and lowering it into engagement therewith, said double-toggle means holding said chain run elevated from said chain-driving sprocket when on one side of its dead-center position, and lowering said chain into engaging relation thereto when on the other side of its dead-center position.

14. A combination according to claim 13 in which said double-toggle means comprises a chain lifter link pivoted on said swing plate, and a chain lifter frame underlying said chain run and having one of its ends pivoted to the end of said first link and having its other end mounted for reciprocating and tilting movement.

15. A combination according to claim 13 in which said double-toggle means further comprises a draw-bar and a pair of links pivoted thereto, one of said pair of links being turnable about a fixed pivot, and the other being pivoted to said lifter link and frame assembly at the region of juncture thereof.

16. In a device of the class described, and in combination, a chain trained about two sprockets, the first of said sprockets being rotatable on a fixed axis and the second being carried by a swing plate movable toward and away from the first, floating means for raising and lowering the lower run of said chain comprising a lifter toggle pivoted at one end to said swing plate and having its other end reciprocally and swingably guided, a driving sprocket underlying said lower run and engaged thereby in the lowered position thereof, and means for guiding the rise and fall of said floating means relative to said driving sprocket to assure alignment of said lower run therewith.

17. In a device of the class described, and in combination, a chain trained about two sprockets, the first of said two sprockets being rotatable about a fixed axis and the second being carried by a swing plate swingable about an outlying axis laterally displaced from the center-line connecting said two sprockets, and floating means comprising a lifter toggle pivoted at one end to said swing plate and having its other end reciprocally and swingably guided for raising and lowering the lower run of said chain, to raise it from and lower it into driving relation to a chain-driving sprocket, said swing plate permitting swinging and foreshortening of said center-line incident to the raising of said lower chain run by said floating means.

18. In a manure-spreader or the like, and in combination, a chain trained about two sprockets, the first of said sprockets being rotatable on a fixed axis and the second being rotatable on an axis swingable towards and from the first, a chain-driving sprocket positioned for engaging a run of said chain between said first-mentioned sprockets, a chain lifter associated with said chain run and comprising a toggle having one of its ends pivoted on said swinging axis and the other of its ends crankwise mounted and having its knee raising and lowering therebetween, and an operating toggle for lifting and lowering the knee of said first-named toggle, means associated with said operating toggle for blocking its throw and holding said knee raised when on one side of its dead-center position, to hold said chain out of engagement with said chain-driving sprocket, said operating toggle lowering said knee when on the other side of its dead-center position to lower said chain into engagement with said chain-driving sprocket.

SAM DANIELS.

REFERENCES CITED

The following references are of record in the file of this patent:

UNITED STATES PATENTS

| Number | Name | Date |
| --- | --- | --- |
| 858,813 | Loos | July 2, 1907 |
| 1,043,247 | Olson | Nov. 5, 1912 |
| 1,486,930 | Smith | Mar. 18, 1924 |